United States Patent [19]

Bos et al.

[11] Patent Number: 4,998,495

[45] Date of Patent: Mar. 12, 1991

[54] FENDER HANGER

[76] Inventors: William J. Bos, 2433 Byron Center Rd. #211, Wyoming, Mich. 49509; John H. Bos, 5444 Eastern, SE., Kentwood, Mich. 49508

[21] Appl. No.: 332,300

[22] Filed: Mar. 31, 1989

[51] Int. Cl.⁵ ............................................. A44B 13/00
[52] U.S. Cl. ...................................... 114/218; 24/130; 114/219
[58] Field of Search ................. 24/130, 129 R, 129 B, 24/128; 224/103, 920; 248/301, 304, 339, 340, 231.8, 230; 114/218, 219, 220, 243, 364; 29/2.1, 2.25; 72/367

[56] References Cited

U.S. PATENT DOCUMENTS

| 1,571,564 | 2/1926 | Walliser | 24/130 |
| 1,637,981 | 8/1927 | Baldwin | 24/130 |
| 2,486,686 | 11/1949 | Wenzel | 24/130 |
| 4,178,661 | 12/1979 | Klein | 24/130 |
| 4,292,911 | 10/1981 | Lindsay | 114/218 |
| 4,432,121 | 2/1984 | Dupre | 24/130 |
| 4,738,214 | 4/1988 | Fry | 114/218 |

OTHER PUBLICATIONS

E&B Discount Marine Catalog (1987); p. 24.

Primary Examiner—Joseph F. Peters, Jr.
Assistant Examiner—Clifford T. Bartz
Attorney, Agent, or Firm—Waters & Morse

[57] ABSTRACT

A device for securing fenders and other objects to the safety rail of a boat includes a tubular portion terminating at one end in a converging configuration that functions as a jam cleat when a line is worked through the tubular portion from the opposite end, with the emerging end then pulled laterally into engagement with the convergence. The device preferably continues beyond the converging configuration to form a hook that can be snapped over and resiliently grasp the boat's hand rail. The device is preferably made in a sequence of operations formed on a piece of thermoplastic tubing, involving splitting the tubing along a fraction of its length, and then opening the split portion to form the convergence. This portion is flattened to also form the hook configuration.

3 Claims, 1 Drawing Sheet

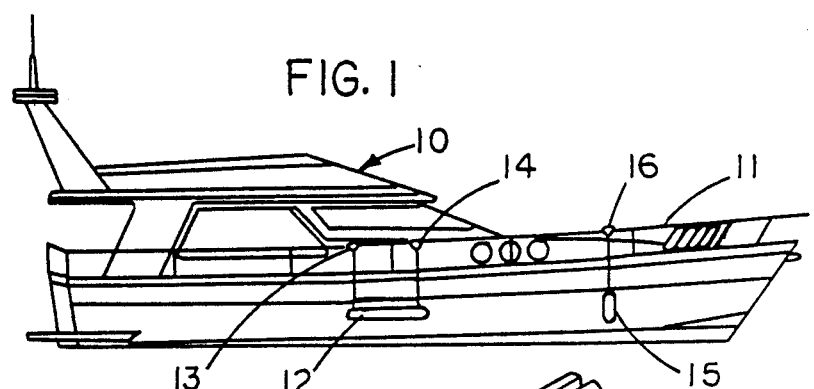

FENDER HANGER

BACKGROUND OF THE INVENTION

In securing a boat to a dock, attention must be given to protecting the boat against abrasion from repeatedly colliding with the dock structure under a combination of wind and wave action. Even under calm conditions, passing boats can produce waves that jostle the boat against anything close to it. The problem exists primarily when the boat is secured at one side only, as the usual marina slip permits dock lines at both sides that can center the boat in the slip clear of danger. The adjacent dock structure is usually one of two types: planar vertical surfaces, or spaced cylindrical pilings. A so-called "fender" has come into almost universal use as a cushion to be interposed between the boat and the possible sources of damage. Both lateral and vertical movement of the boat against the dock must be considered. Carefully placed spring lines will usually minimize fore-aft movement.

Placement of the fenders is something of an art. These generally cylindrical cushions can be from a foot to three feet long, and from four inches to a foot in diameter. Usually, a short line extends from one or both ends of the fender to be tied to some convenient part of the boat to place the fender in the desired position. Opposite a piling, the fender is usually placed horizontally; and against a broad vertical surface, it is usually vertical. Fenders can be tied to deck cleats, or to the safety rails usually installed around the periphery of the deck. The present invention is associated with the latter arrangement. It has also been found useful as a storage hanger for coiled and shanked dock lines, and for securing throwable life preservers that must be freed quickly for use.

SUMMARY OF THE INVENTION

A line-securing device has a tubular line receptacle with one end defined by a converging configuration. The line is worked through the tubular portion, and then pulled laterally into the entrapment of the convergence. The effect is similar to that of a jam cleat. The device continues beyond the end of the tubular portion to form a hook adapted to snap resiliently over the safety rail of the boat. The device is preferably made from a piece of thermoplastic tubing split along part of its length. Opening and flattening the split portion produces the convergence to the end of the tube. The flattened portion is easily formed into the hook.

DESCRIPTION OF THE DRAWINGS

FIG. 1 is a side elevation of a typical power cruiser of moderate size, showing the installation of fenders in two different positions.

FIG. 2 is a perspective view showing the first stage of the manufacture of the device from a piece of thermoplastic tubing.

FIG. 3 illustrates the opening and flattening of the split portion of the tube.

FIG. 4 is a perspective view showing the completed formation of the device.

FIG. 5 shows the installation of the device over the guard rail of the boat, with a fender line secured in position.

DESCRIPTION OF THE PREFERRED EMBODIMENTS

Referring to the drawings, the boat generally indicated at 10 in FIG. 1 has a conventional safety rail 11 surrounding the periphery of the deck. The fender 12 is shown installed in horizontal position, suspended from the devices 13 and 14 engaging the rail 11. The fender 15 is shown suspended in vertical position from the device 16, which is also engaging the rail 11. The devices 13, 14, and 16 are alike, and the preferred construction of these is shown in FIGS. 2-4. Their engagement with the rail 11 is illustrated in FIG. 5. Referring to FIG. 2, the first step in the preferred manufacture of the device is the slitting of a short length of PVC (polyvinyl chloride) tubing 17 along a portion of its length, as indicated at 18. With heavier wall thickness of the tubular portion, the slit can extend the full length of the piece. The "tubular" portion, as the term is used here, refers to that part of the piece where the line cannot normally be pulled through the convergence. With a full-length slit, the device can be rolled up from flat material. The formation of a slit tube would then be included in the process of rolling up the flat piece. The slit portion, or the upper end of it, is then opened and flattened as shown in FIG. 3, producing a converging end 19 to the tubular portion 20, and a flat panel 21 that is then bent into the hook-shaped configuration 22 curving away from the axis of the tubular portion, as illustrated in FIG. 4. At some point in the operation, the opposite end of the tubular portion 20 may be flared at 23. The end of the panel 21 is preferably tapered, as shown at 24 and 25, so that the resulting configuration conforms somewhat to the convergence 19, as shown in FIG. 4.

Since the amount of strain on the lines supporting the fenders 12 and 15 is relatively light, it is common to use suspension lines of anywhere from one-quarter ($\frac{1}{4}$) to one-half ($\frac{1}{2}$) of an inch in diameter. The preferred inside diameter of the tubular portion 20 is therefore selected to be approximately three-quarters ($\frac{3}{4}$) of an inch, so that any of the common lines can easily be slipped through endwise from the flared portion 23. The emerging end can then be grasped and pulled laterally into the convergence 19 to secure the fender in position. It appears that the hand rails of the type shown at 11 are commonly either three-quarters ($\frac{3}{4}$) of an inch or one (1) inch in diameter, and the diameter of the hook portion 22 should be selected to provide at least a gentle grip on the three-quarter ($\frac{3}{4}$) inch size. The natural resiliency of the PVC material will permit the opening of the hook portion to also receive the one (1) inch rail very easily. The resulting resilient grasp on the rail will prevent the device from sliding lengthwise along the rail 11, and will thus maintain the position of the fenders as originally installed. In FIG. 5, the fender suspension line 26 is shown after it has been slipped upwardly through the tubular portion 20 and then pulled laterally into the grip of the convergence 19. Usually, the device will be snapped over the rail before the line 26 is inserted, since it is easier to position the fender accurately with this procedure. The free end of a shanked dock line can also be worked through the device to provide a convenient storage when the dock line is not in use. A line suspending a throwable life preserver can be secured in the same manner. A quick release is obtained by an upward pull on the end of the line shown at 26, which permits the suspended article to fall free, as long as the line is kept out of engagement with the convergence 19. The release can be almost instantaneous, which is highly desirable for emergency use of the life preservers.

What is claimed is:

1. A method of manufacturing a line-securing device, comprising:

slitting a piece of tubing of formable material along at least a portion of its length;

opening and flattening the end of said slit portion, producing a converging configuration at the end of said tubular portion; and forming said flattened end into a hook.

2. A method as defined in claim 1, wherein said material is thermoplastic.

3. A method as defined in claim 1, wherein said hook curves away from the axis of said tubing.

* * * * *